Figure 2:
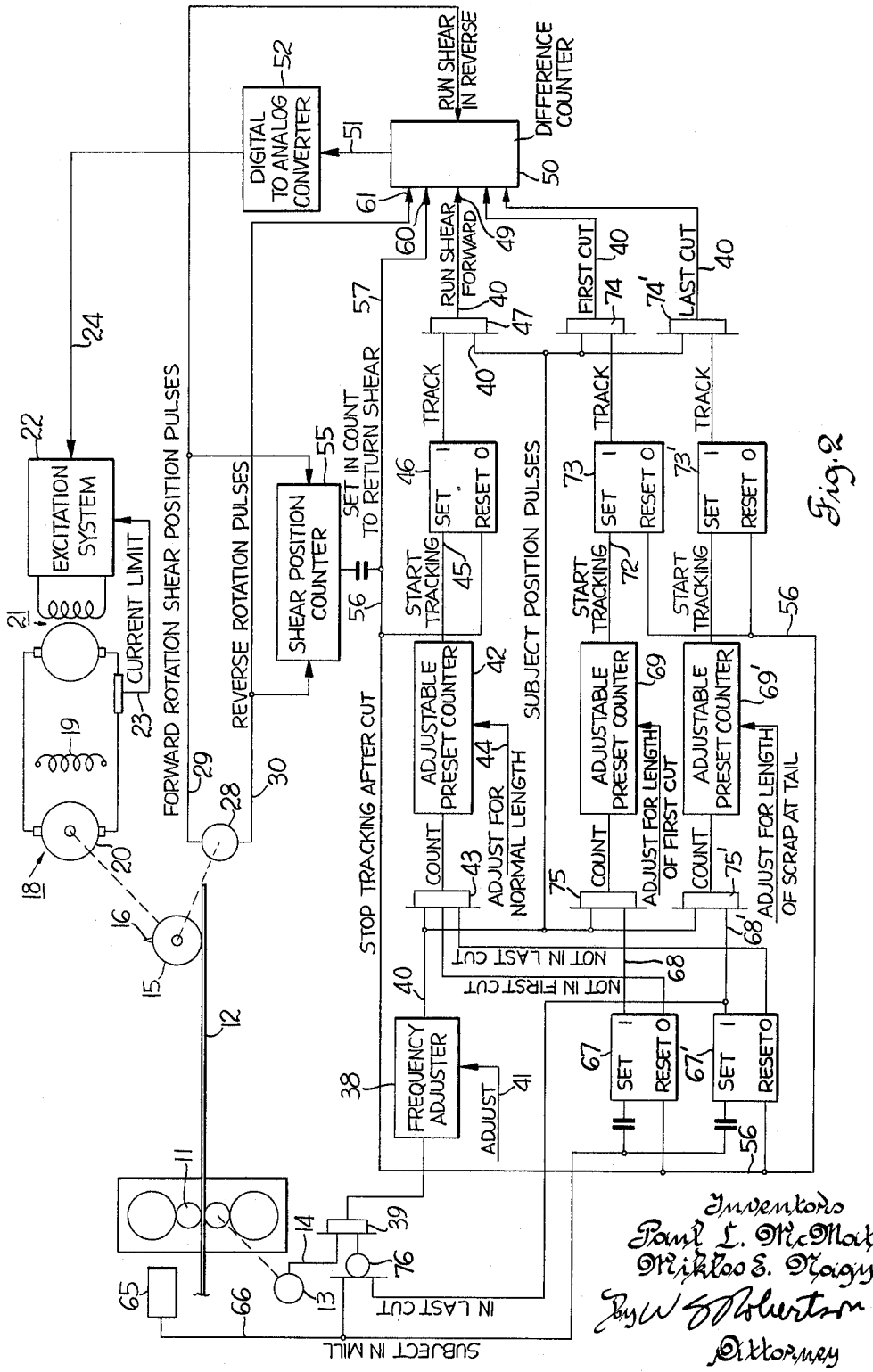

Feb. 1, 1966   P. L. McMATH ETAL   3,232,157
DIGITAL CONTROL FOR SHEAR
Filed June 21, 1963   2 Sheets-Sheet 1
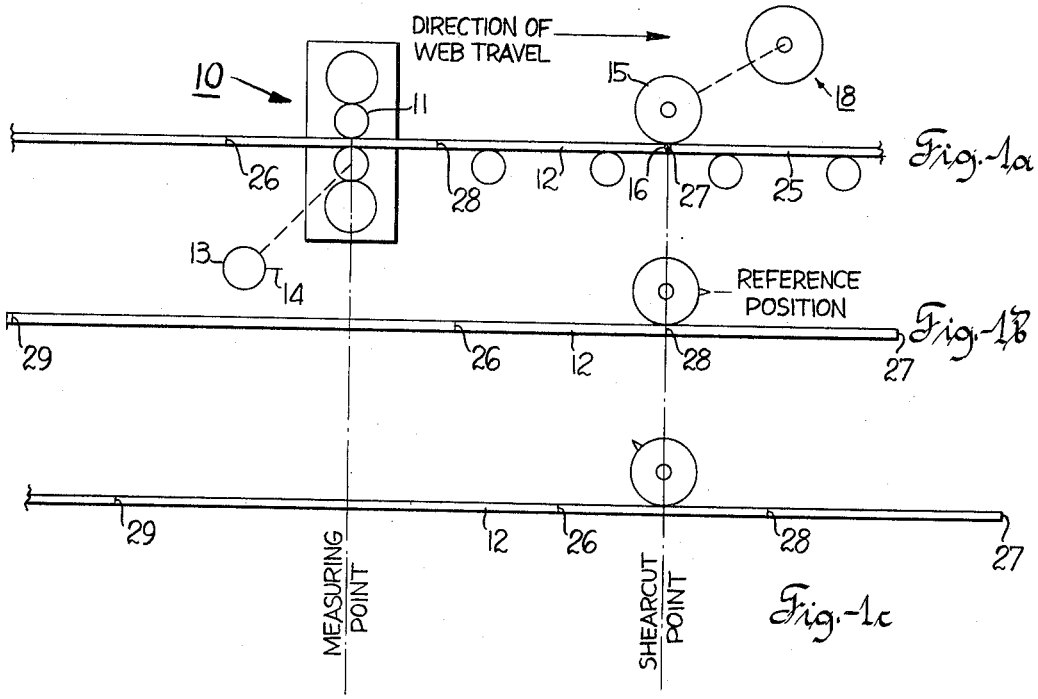
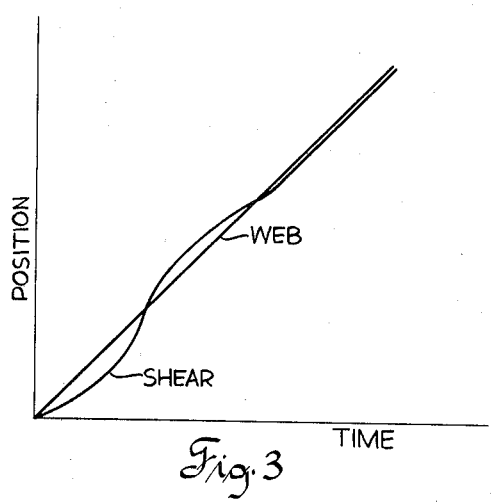
Inventors
Paul L. McMath
Miklos E. Nagy
By W. S. Robertson
Attorney United States Patent Office 3,232,157
Patented Feb. 1, 1966

3,232,157
DIGITAL CONTROL FOR SHEAR
Paul L. McMath, Hales Corners, and Miklos E. Nagy, Wauwatosa, Wis., assignors, by direct and mesne assignments, to Allis-Chalmers Manufacturing Company, Milwaukee, Wis.
Filed June 21, 1963, Ser. No. 289,608
5 Claims. (Cl. 83—76)

This invention relates generally to motor control systems. More specifically this invention relates to a control for driving a shear to cut a continuously moving web into successive preselected lengths.

When a continuously moving web is to be cut into successive lengths without stopping the web, it is usually desirable to drive the cutting device forward at the same speed as the web. For example, in shearing lengths of pipe, the shear blade dulls rapidly unless it is traveling forward at the same speed as the pipe. The prior art has suggested rotating a shear so that the circumferential speed of its blade equals the linear speed of the subject. The blade can be moved in and out radially to make a cut after a selected number of revolutions. Such a system matches the speeds properly, but it provides only a few fixed lengths to which the subject can be cut. It is also well known to rotate the shear at a speed that is different from the web speed to cut the web in any selected lengths. One of the objects of this invention is to provide a new and improved control that drives a shear at the same speed as the web when the blade approaches the web and stops the shear or varies its speed as appropriate between cuts to cut the subject in any preselected length.

It is also known to mount a cutting device, such as a saw, on a carriage that can be driven along with the web at the proper speed and clamped to the web at the proper point to make the cut. A more specific object of this invention is to provide a new and improved control for a shear that is stationary in a process line so there is relative motion between the shear and the web. In such a system it is a complex problem to drive the shear blade at the same speed as the web and to make the cut at a preselected point on the web.

The preferred embodiment of the control of this invention uses digital components. The control has a first pulse generator that is connected to produce pulses corresponding to very small increments of advance of the subject. It has a second pulse generator that is connected to produce pulses corresponding to equivalent increments of travel of the shear. Thus, starting from a reference point on the subject the proper distance ahead of the cut point, there is a one to one relation between subject position and shear position in which the shear blade meets the preselected cut point. When the reference point reaches the point where the shear makes the cut, the control starts driving the shear to track the subject, point for point, to cut the subject at the preselected cut point on the subject. A difference counter receives the two sets of pulses and produces a count indicating whether the shear position is ahead or behind the corresponding subject position. In response to this count, the control speeds up or slows down the shear motor to match the position of the shear to the position of the subject. When the shear is driven in step with the subject, the circumferential speed of the blade equals the linear speed of the subject.

To establish the length the subject is cut into, the control has a preset adjustable counter that receives the subject position indicating pulses, counts to a preselected count that corresponds to the selected length of the pipe, and then transmits pulses to the difference counter to start the shear. The control also has components for repositioning the shear after a cut, for making special cuts at the head and the tail of the pipe, and for cutting very short lengths.

One of the advantages of this control is that the shear cuts the subject into accurate lengths even if the speed of the subject varies. Another advantage of this control is that nonlinearity of the shear motor acceleration characteristics does not reduce the accuracy of the control and the shear.

In the drawing:
FIGS. 1A, B and C show a shear and a subject in a sequence of positions as the shear tracks and cuts the subject;
FIG. 2 is a schematic of the control of this invention; and
FIG. 3 is a graph of the positions of the shear blade and the subject cut point as the shear is driven to track the pipe.

The rotary shear

FIG. 1 shows a pipe mill reducing stand 10 having work rolls 11 that are driven to operate on a length of pipe 12. Work rolls 11 provide a convenient means for connecting a pulse generator 13 to be driven at a speed that corresponds to the speed of pipe 12. Pulse generator 13 produces pulses at its output 14 corresponding to small incremental changes in the position of pipe 12. A rotary shear 15 having a blade 16 is positioned at the exit of the mill and is driven by a motor 18 to cut pipe 12 into successive lengths.

As FIG. 2 shows, motor 18 has a field winding 19 connected to be energized by a constant current source and it has an armature winding 20 that is connected to be energized by a D.C. generator 21. Generator 21 is mechanically driven by means such as an electric motor (not shown); the magnitude and polarity of its voltage are controlled by an excitation system 22 in response to a current limit signal 23 and a control signal 24 that will be described later. Motor 18 is controlled in response to signal 24 to position shear 15 with its blade 16 in a reference position (FIG. 1B) and to drive the blade from the reference position to a cutting position (FIG. 1A) in step with pipe 12.

Shear 15 is connected to drive a pulse generator 18 that produces pulses 29 corresponding to small increments of circumferential travel of blade 16 when the shear is rotating forward. Pulse generator 18 produces pulses 30 (corresponding to the same increments as pulses 29) when the shear rotates in reverse.

FIG. 1A shows the shear 15 in its cutting position where it has just severed a length 25 of pipe 12. The next cut point, 26, is a preselected distance from the newly formed leading edge 27 of the pipe. A reference point 28 on pipe 12 is spaced ahead of cut point 26 by the circumferential distance that shear blade 16 travels forward from the reference position to the cut position. When pipe reference point 28 reaches the shear cut point (FIG. 1B) shear 15 should start to be driven in step with pipe 12 so that blade 16 will strike the pipe at the selected pipe cut point 26. FIG. 1C shows shear 15 between its reference position and its cut position as it is driven forward to cut pipe 12 at point 26.

The control—Normal mode

The operation of motor 18 and shear 15 to cut pipe 12 into successive equal lengths will be called the "normal mode." The control also operates shear motor 18 for special related operations that will be described later.

The relation between the pulse frequency of output 14 and the corresponding increment of pipe length depends on the diameter of work rolls 11. Since the diameter of work rolls 11 may be changed, the control is provided with a pulse frequency adjusting device 38 that receives pulses 14 (AND gate 39 is open as will be explained) and is adjustable to produce output pulses 40 with the same relation to the increments of pipe length as the relation of shear pulses 29, 30, to increments of shear position. Preferably, pulse frequency adjusting device 38 is a counter that is set as indicated by arrow 41, to produce a signal pulse at its output 40 for a preselected number of pulses at the input.

A length counter 42 is connected to receive pulses 40 from pulse frequency adjusting device 38 when the control is operating in the normal mode. (AND gate 43 is open in the normal mode as will be explained later.) Length counter 42 is preset as represented by arrow 44 to count to a predetermined number of pulses in continuous cycles. When length counter 42 reaches the preset count, it produces a momentary signal at its output 45 and begins the next count with the next input pulse 40. A flip-flop 46 is connected to be set by output 45 and to control an AND gate 47 to supply length pulses 40 from frequency adjuster 38 to an input 49 of a difference counter 50 to count down (arbitrary) the difference counter.

Difference counter 50 also receives forward direction pulses 29 from the shear pulse position generator 28 and counts up in response to pulses 29. Difference counter 50 counts down when it receives pipe position pulses 40 faster than it receives shear position pulses 29. It counts up when it receives shear pulses 29 faster than pipe pulses 40. The count value at the output 51 of difference counter 50 indicates whether the shear is tracking properly with the pipe (zero count value) or is ahead or behind the position of the pipe 12. A digital to analogue converter 52 is connected to receive output 51 of difference counter 50 and to produce signal 24 that controls motor 18. Control signal 24 varies in polarity to indicate whether the shear should be driven forward or in reverse, and it varies in magnitude according to the magnitude of the count at output 51.

Both forward and reverse outputs 29, 30, of shear position pulse generator 28 are connected to a counter 55 that follows the shear position (as indicated by the count value). When shear 15 reaches the cut position, counter 55 energizes two outputs 56, 57 momentarily (as represented by the capacitor). Output 56 is connected to energize the reset input of flip-flop 46 to stop the down count at input 49 of difference counter 50 until flip-flop 46 is again set at the end of the next length count. Output 56 also resets other flip-flops that will be described later. Output 57 helps to return the shear to its reference position as will be explained later.

Operation in the normal mode

In the normal mode AND gates 39 and 43 are open and length counter 42 receives a continuous train of pulses 40, and it continuously cycles to set flip-flop 46 when a preselected length of pipe 12 passes the cut point. When flip-flop 46 is set, AND gate 47 opens and transmits pipe position pulses 40 to input 49 of difference counter 50. Difference counter 50 counts up and its output 51 has a count value that indicates that the pipe position is ahead of the shear position. In response to output 51, analogue to digital converter 52 gives control signal 24 the proper polarity to start driving shear 15 forward. The shear motor 18 accelerates rapidly as FIG. 3 shows (controlled in part by current limit signal 23), and shear pulse generator 28 produces forward pulses 29 at the up input of difference counter 50 to count the difference counter up. After a transient period, the shear reaches the speed at which the difference output 51 is very nearly zero count and the shear tracks properly with the pipe to cut the pipe at the preselected cut point.

When shear 15 reaches the cut position (FIG. 1A) shear position counter 55 momentarily energizes its output 56 to reset flip-flop 46 and thereby stop the down count. Other elements of the control which return the shear to its reference position will be described next.

Shear return

When shear 15 reaches its cut position, output 57 of shear counter 55 energizes an input 60 of difference counter 50 to give the difference counter a down count value corresponding to the circumferential distance between the cut position and the reference position of the shear. With this count value at its output 51, difference counter 50 continues to energize digital to analogue converter 52 to drive shear 15 forward. As shear 15 passes the cut position, forward pulses 29 from shear position pulse generator 28 continue to count up difference counter 50 toward zero. As the count at output 51 decreases, digital to analogue converter 52 decreases the excitation of generator 21 toward zero and thereby slows motor 18 toward a stop as shear 15 approaches its reference position.

When shear 15 reaches its reference position, the count at output 51 of difference counter 50 is zero. Whenever shear 15 overshoots the reference position, shear position pulse generator 28 counts up difference counter 50 and gives it an up count value at its output 51 corresponding to the point past the shear reference position where shear 15 stops. In response to this up count at output 51, converter 52 reverses the polarity of the field of generator 21 and thereby reverses the direction of motor 18 (the motor field current polarity is kept constant) to run shear 15 in reverse toward the reference position. As the control runs motor 18 in reverse in response to the up count at output 51, shear position pulse generator 28 energizes only its reverse output 30. Output 30 is connected to a down count input 61 of difference counter 50 to count down to zero as shear 15 returns to its reference position. Thus, the count at output 51 varies to return shear 15 to the reference position from either side.

Trimming the leading edge of the pipe

As the control has been described so far, it would make the first cut at a nonstandard length. The fact that the shear cut position is shown somewhat to the exit side of the place where the pipe pulse generator 13 senses the pipe movement tends to shorten the first segment. While a standard length of pipe passes the sensing point, only a shorter length passes the shear cut point. The fact that length counter 43 begins the first count at the leading edge whereas it begins each normal mode count at the reference point, which is ahead of the edge, tends to lengthen the first cut by the distance from the reference point 28 to the cut point 26. To cut the first segment at a selected standard or nonstandard length, length counter 42 may be set to the appropriate count for the first cut and then reset to the selected standard length for the next cut.

For many cutting processes, the first segment should not be cut to the preselected length, but only to a very short length to square up the leading end of the pipe. The control as it has been described so far provides this operation when counter 42 is set to an appropriate length for the first cut and then reset to the standard length.

The drawing shows components for automatically cutting a selected standard or nonstandard length of pipe 12 on the first cut. These components can be thought of as a functional representation of the control features described in the preceding paragraph or as additional components.

A pipe detector 65 is located at any suitable place to produce an output signal 66 in response to the presence of pipe 12. A flip-flop 67 is connected to be set in response to a momentary change in the level in one direction of signal 66 and to energize an output 68 until it is reset by signal 56 as the first cut is made. Output 68 of flip-flop 67 is connected to operate an adjustable first length counter 69 that is preset for the selected length of the first cut. When counter 69 reaches the preset count, it energizes its output 72 to set a flip-flop 73 and open an AND gate 74 to transmit length pulses 40 to difference counter 50. The operation of preset counter 69 and other components during the first cut is similar to the normal mode operation already described.

To prevent preset counters 42 and 69 from operating at the same time, two AND gates 43 and 75 are connected to respond to one and zero outputs of flip-flop 67 to direct pulses to counter 69 during the first cut and to counter 42 after the first cut.

Trimming the tail of the pipe

Preferably, pipe detector 65 is positioned far enough to the entry side of shear 15 to respond to the tail of the pipe in time for the control to operate the shear to cut off a scrap portion of preselected length. (The last usable segment may be shorter than the standard length). The additional components for trimming the tail of the pipe may be similar to the components for trimming the leading edge of the pipe, and corresponding numbers primed are used in the drawing. As FIG. 2 illustrates this part of the control, flip-flop 67' is made to respond to a change in level of signal 66 in the opposite direction from flip-flop 67. AND gate 43, which is open only in the normal mode has an additional input that receives the zero output of flip-flop 67' to isolate preset counter 42 from length pulses 40 during the last cut.

If the tail of pipe 12 reaches detector 65 while the control is operating the shear 15 to cut the pipe, the signal at the outputs of flip-flop 67' simply close gate 43 and open gate 75' so that pulses 40 continue to count down counter 50 until the cut is made. When the cut is made, the shear position counter 55 resets flip-flops 46, 67' and 73'.

Preferably, the control includes means to stop the shear after the last cut and to restart the shear when the leading edge of the next pipe 12 enters the mill. (Work rolls 11 may be driven continuously between successive pipes.) A suitable means comprises AND gate 39 and an OR gate 76 that are connected to transmit pipe position pulses 14 in response to the presence of an output from pipe sensor 65 or the one output of flip-flop 67', which is energized during the last cut cycle. AND gate 75 closes after last cut flip-flop 67' is reset when the last cut is made and it is reopened when the leading edge of the next pipe actuates detector 65.

Operation to cut short lengths

As the normal operation and the last cut have been described so far, the pipe segments are at least slightly longer than the circumferential distance that shear blade 16 travels in a full circle. When length counter 42 is set to cut pipe 12 into segments equal to the blade circumferential path, the control drives the shear continuously instead of slowing the shear to stop at its reference position as has been described.

Suppose that preset counter 42 (or 69') begins counting down difference counter 50 after a cut, but before shear 15 has returned to its reference position. When this count begins, difference counter 50 already has a down count value from input 60 corresponding to the distance between the reference position and the actual position of the shear. While AND gate 47 is open, difference counter 50 receives pulses corresponding to the distance between the reference position and the cut position. The sum of the two inputs 49 and 57 to difference counter 50 equals the distance that shear 15 must be driven to make the cut while the pipe advances only the distance between the pipe reference point 28 and pipe cut point 26. Thus, the shear starts from behind its reference position but with the count at input 57 it runs faster than pipe 12 until it reaches the corresponding position and tracks properly.

The converse operation takes place if the count at input 49 starts while shear 15 is forward of its reference position. As shear 15 rotates forward of the reference position, shear position pulse generator 28 counts up difference counter 50 to the corresponding count value. Pulses 40 at input 49 count down difference counter 50 from this value before signal 24 is given the proper polarity to drive shear 15 forward. After a transient period the shear tracks properly with pipe 12.

Similarly, preset counter 42, 69, or 69' can be set for a length less than the circumferential distance of the shear blade 16. Pipe pulse generator 13 would supply somewhat fewer pulses to difference counter 50 than the number necessary to drive shear 15 from its reference position to its cut position. Shear position counter 55 is connected to supply the additional count along with the usual shear return count at input 60 when the shear makes a cut.

In this operation to cut lengths less than the circumferential distance of shear blade 16, the shear motor 18 is accelerated faster than in the operations already described. The limit of the ability of the motor to accelerate the shear limits the minimum length the pipe 12 can be cut into (for a given speed of the pipe). The current limit feature is provided to protect the motor from unduly high loads in response to control signal 24. When the motor approaches its armature current rating, current limit signal 23 overrides control signal 24; this prevents the system from functioning normally. When the control is set to cut segments shorter than the distance the shear travels between its reference position and its cut position, signal 56 would reset flip-flop 46 shortly after it was set by signal 45. For this operation flip-flop 46 is set manually to keep AND gate 47 open continuously.

Other embodiments

The example of a specific embodiment of the invention will suggest applications of the control to drive various types of cutting devices to operate on various subjects. For example, the control can be used with shears in which the blades are driven in an elliptical path rather than in the circular path described. The logic circuits that FIG. 2 shows will suggest many functionally equivalent circuits. For example, counter 42 may be connected to be reset by output 57 of shear position counter 55 instead of recycling at this point as has been described. The control may have some analogue components where the control of FIG. 2 has digital components.

Those skilled in the art will recognize other variations within the scope of the claims.

Having now particularly described and ascertained the nature of our said invention and the manner in which it is to be performed, we declare that what we claim is:

1. A control for a motor driving a shear to cut a continuously moving subject into preselected lengths, comprising, a pulse generator for producing subject position pulses corresponding to predetermined increments of subject advance with respect to a point where the shear operates to cut the subject, means including a preset counter connected to receive said subject position pulses and operable after each succession of a preset number of said pulses to produce said pulses at its output until a cut is made, a pulse generator for producing forward shear position pulses when the shear is going forward and reverse shear position pulses when the shear is going in reverse, the increment of shear blade travel represented by a shear position pulse corresponding to the increment of subject advance represented by a subject pulse, a difference counter connected to count in one direction in response to said subject pulses at said output, to count in said one direction in response to said reverse shear position pulses, and to count in the opposite direction in response to said forward shear pulses, said difference counter producing at its output a count value varying in direction according to whether the shear position is ahead or behind the subject position, a digital to analogue converter responsive to said count value to produce a motor control signal variable to cause the motor to properly track the subject, and means operable when the shear makes a cut to give said difference counter a count value in said one direction corresponding to the distance between the shear cut position and reference position.

2. A control according to claim 1 in which said means operable when the shear makes a cut includes a difference counter connected to be responsive to the difference between the number of forward shear pulses and reverse shear pulses to produce an output at a count corresponding to the shear cut position.

3. A control according to claim 2 in which said output of said means operable when the shear makes a cut is connected to stop the transmission of subject pulses to said difference counter after each cut.

4. A control for a motor driving a shear to cut a continuously moving subject into preselected lengths, comprising, a pulse generator for producing subject position pulses corresponding to predetermined increments of subject advance with respect to a point where the shear operates to cut the subject, means including a preset counter connected to receive said subject position pulses and operable after each succession of a preset number of said pulses to produce said pulses at its output until a cut is made, a pulse generator for producing shear position pulses, the increment of shear blade advance represented by a shear position pulse corresponding to the increment of subject advance represented by a subject pulse, a difference counter connected to receive said subject pulses at said output and to receive said shear position pulses and operable to produce a count value that is zero when the shear position corresponds to the subject position properly to make a cut at a preselected length and with the shear blade traveling at the same speed as the subject, said count value varying in direction according to whether the shear position is ahead or behind the subject position, and a digital to analogue converter responsive to said count value to produce a motor control signal variable to cause the motor to properly track the subject, a control including means to return the shear to a reference position after each cut comprising, means for producing a signal indicating that the shear has reached its cut position, and means responsive to said signal to give said difference counter a count value having a direction to drive the shear forward and having a magnitude corresponding to the distance between the shear cut position and shear reference position in the forward direction.

5. A control for a motor driving a shear forward to cut a continuously moving subject into preselected lengths, comprising, means for signaling the presence of a subject to be cut by the shear, a pulse generator for producing subject position pulses corresponding to predetermined increments of subject advance with respect to a point where the shear operates to cut the subject, means including a preset counter responsive to said signaling means to receive said subject position pulses when a subject is present and operable after a first succession of a first preset number of said pulses and operable after each following succession of a second preset number of pulses while the subject is present at said sensing means to produce said subject pulses at its output, a pulse generator for producing shear position pulses, the increment of shear blade advance represented by a shear position pulse corresponding to the increment of subject advance represented by a subject pulse, a difference counter connected to receive said subject pulses at said output and to receive said shear position pulses and operable to produce a count value that varies in direction and magnitude according to the direction and distance of the shear position with respect to the subject position, and a digital to analogue converter responsive to said count value to produce a motor control signal variable to cause the motor to properly track the subject, means including a preset counter connected to said signaling means to be responsive to the tail of the subject and operable after a succession of a third preset number of pulses to transmit subject pulses to said difference counter to begin driving said shear forward to cut off a short scrap section at the tail of the subject.

References Cited by the Examiner
UNITED STATES PATENTS

| | | | |
|---|---|---|---|
| 2,995,968 | 8/1961 | Tomberg | 83—76 X |
| 3,029,675 | 4/1962 | Alexander et al. | 83—76 |
| 3,048,751 | 8/1962 | Taylor | 83—76 X |

WILLIAM W. DYER, JR., *Primary Examiner.*

WILLIAM S. LAWSON, *Examiner.*